April 7, 1931.  A. F. EVANS  1,799,549
INJECTION OF FUEL IN INTERNAL COMBUSTION ENGINES
Filed May 9, 1928   4 Sheets-Sheet 4
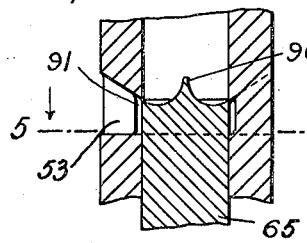
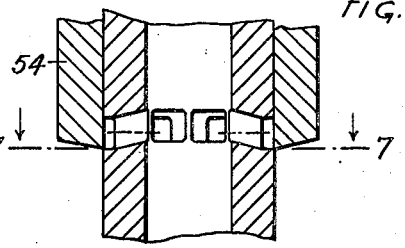
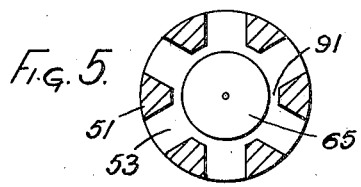
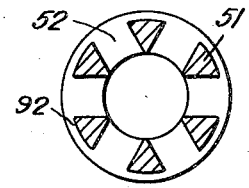
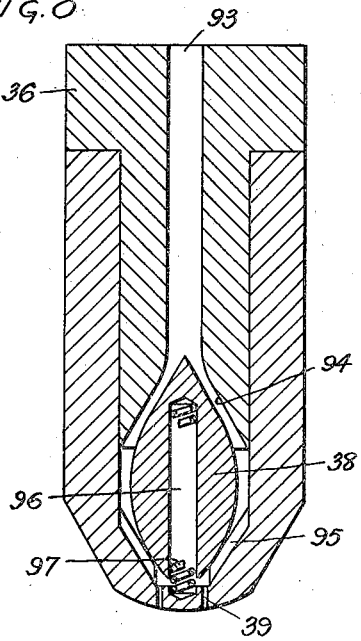
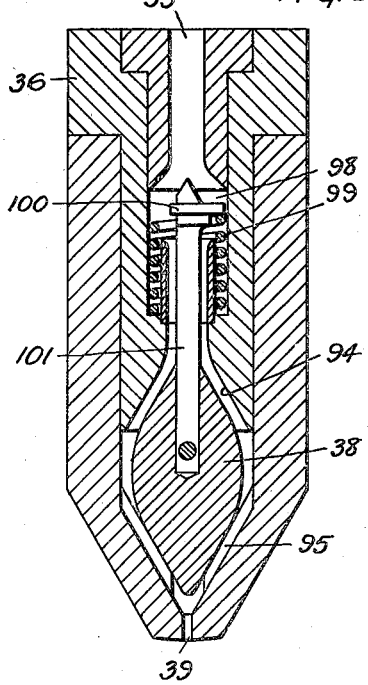
INVENTOR.
A.F. EVANS Patented Apr. 7, 1931

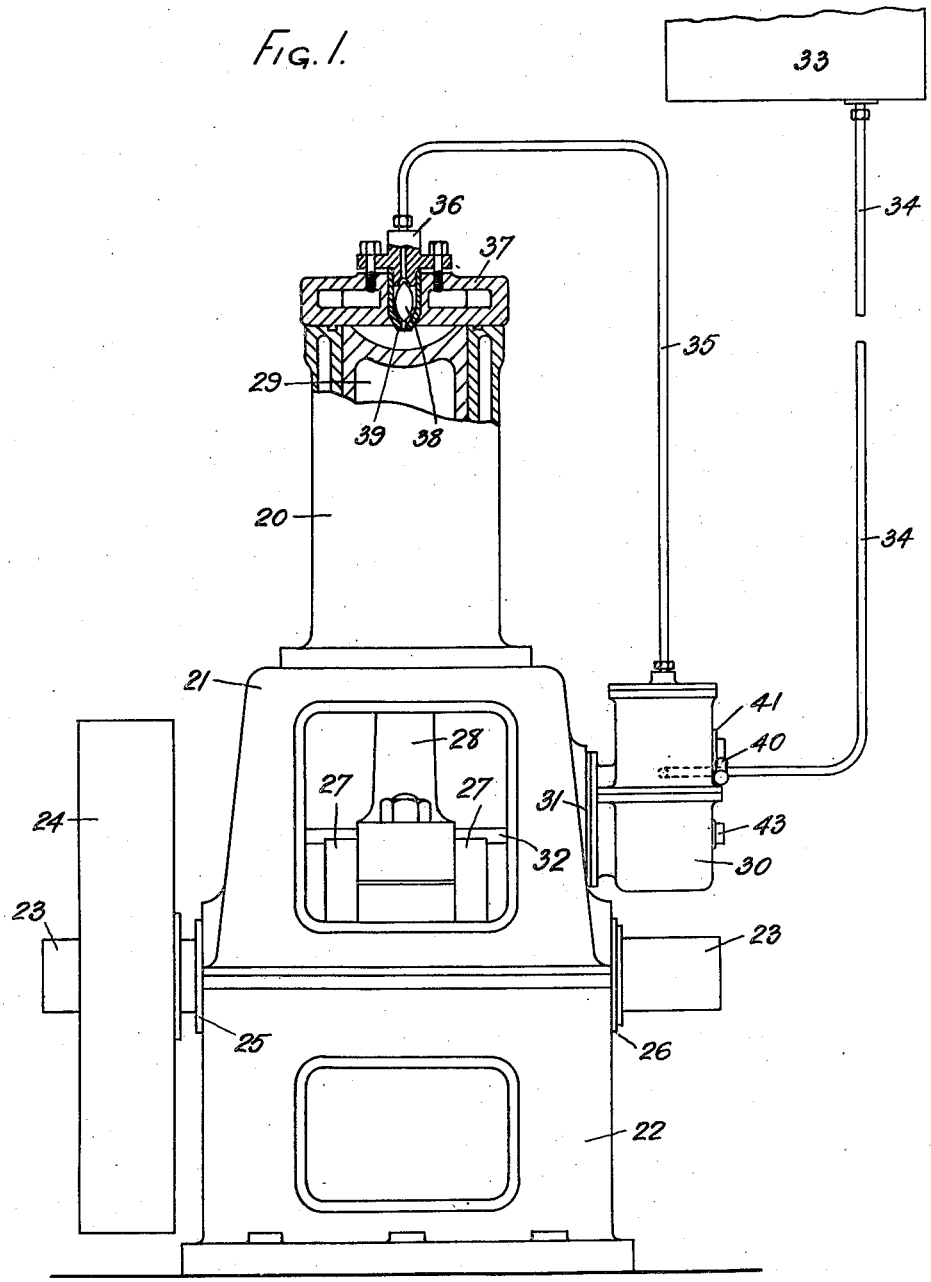

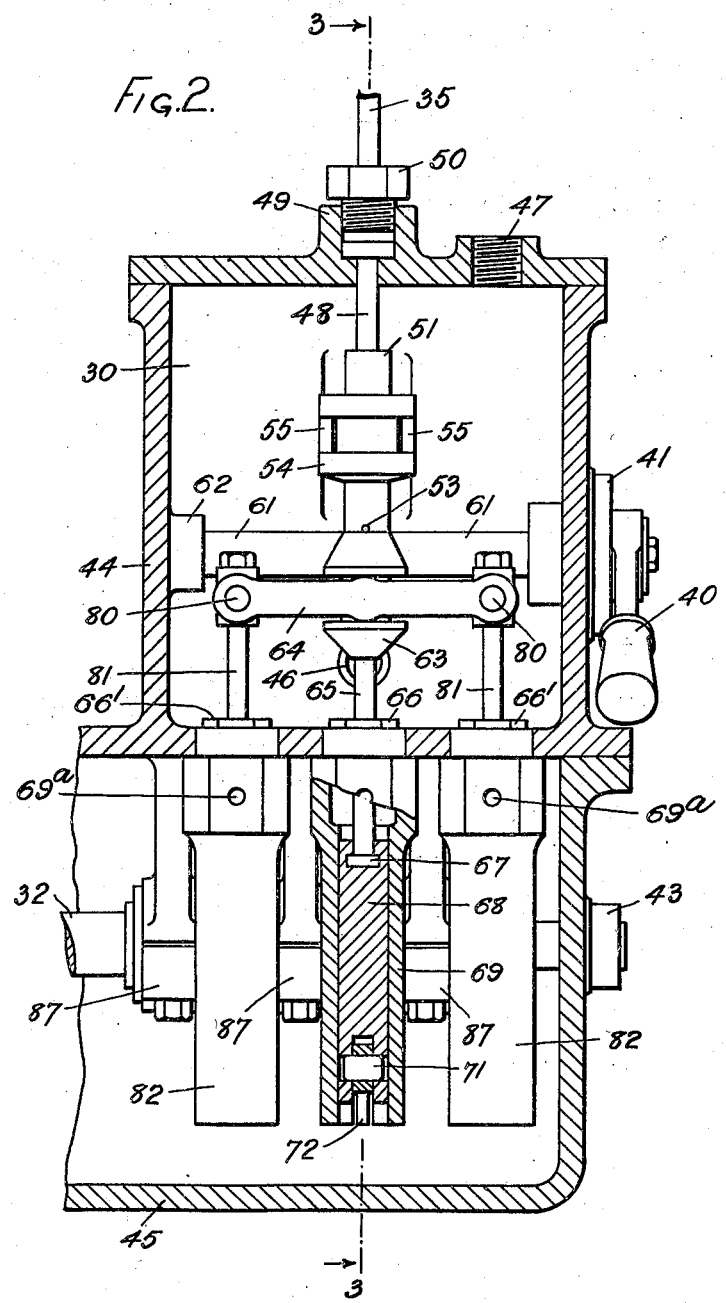

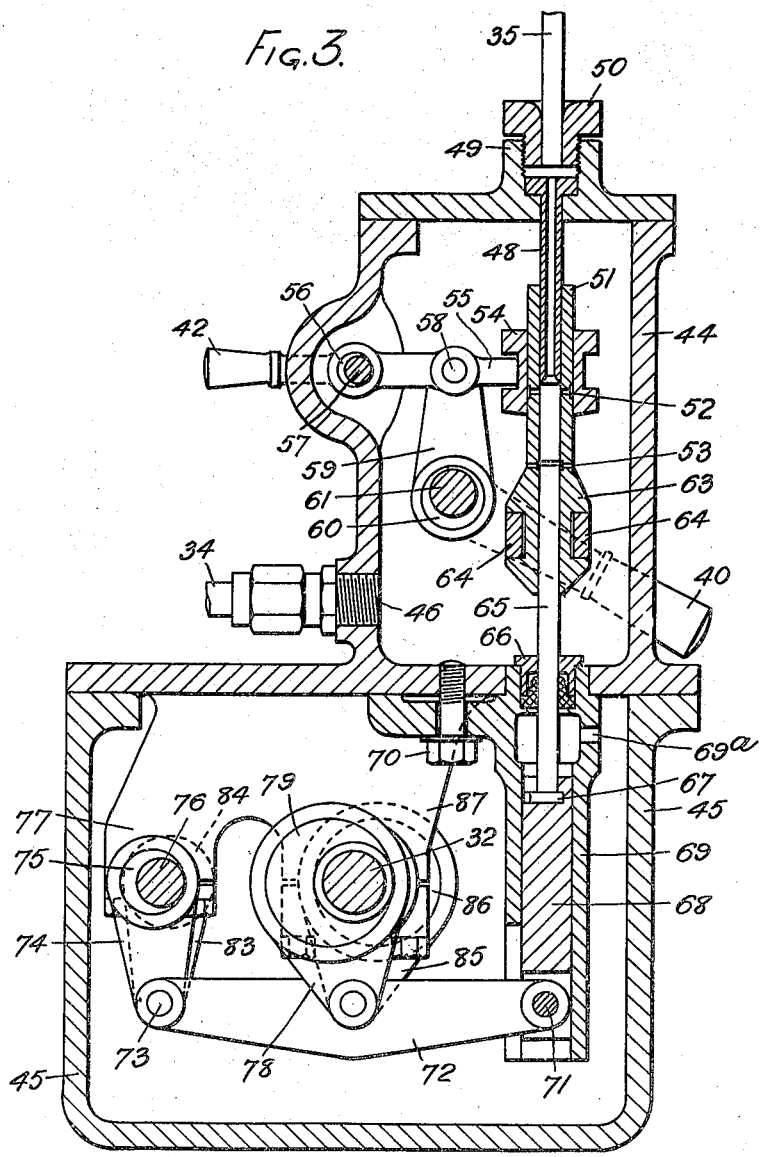

1,799,549

UNITED STATES PATENT OFFICE

ARTHUR FREDERICK EVANS, OF BARNES, ENGLAND

INJECTION OF FUEL IN INTERNAL-COMBUSTION ENGINES

Application filed May 9, 1928, Serial No. 276,444, and in Great Britain June 27, 1927.

This invention relates to methods of and apparatus for injecting liquid fuel into internal-combustion engines.

In the case of internal-combustion engines operating upon the Diesel principle or some modification thereof it is known to inject the liquid fuel into the combustion chamber in a relatively gradual manner and in a fine state of pulverization through the agency of a pump.

The generally-accepted desiderata for successful injection (from the point of view of mean working pressure, flexibility of control, and economy in consumption,) are the following:—

(a) The fuel pump shall deliver to the engine a definite and controlled quantity of fuel at each cycle.

(b) The time of the commencement of the injection shall remain constant in all conditions of load and speed and shall be adjustable as required.

(c) The angular period of fuel load delivery or injection shall be capable of being arranged to suit the circumstances.

(d) The commencement of injection shall be quite definite, the pressure shall remain constant during injection, and the termination of injection shall be quite definite.

(e) The injection pressure shall be high, up to ten thousand pounds if this is necessary, and this pressure shall be adjustable.

(f) The fuel shall only be subject to pressure during the actual period of injection.

Apparatus at present in use fail to comply with these exact requirements in many ways. In some cases the principle of using the middle portion of the stroke of an exceptionally long-stroke pump plunger has been applied, but in this case poppet valves have also been used, and the advantage to be derived from the very rapid cut-off which I make use of has not been obtained.

The present invention has for its primary object a particularly suitable method of injecting the fuel into the combustion chamber, by which the above-mentioned desiderata will be fully, or very nearly so, satisfied. In accordance with the invention the fuel is supplied to the engine by or under the influence of pressure set up in the liquid fuel by the fuel pump.

In one way for carrying out my present invention a column of liquid fuel is put under pressure by a pump so designed as to set up pressure in the said column of liquid fuel for the direct introduction of the said fuel into an engine. The pump comprises oppositely moving members such as a plunger and an enclosing sleeve moving in opposite directions, the plunger having an exceptionally long stroke, and I so arrange and construct this pump as to give such a quick cut off or closure of the inlet port that the pressure or sonic waves are set up in the column of liquid operated upon by the pump plunger. The injection takes place under the influence of such waves combined with or during the compression due to the operation of the pump plunger and until the waves and pressure are dissipated by the opening of a secondary outlet or release port, which port is preferably adjustable as to its time of opening.

For the purpose of opening and closing communication with the oil reservoir at the required times, the enclosing sleeve (which may be termed the "valve sleeve") is preferably provided, in addition to the inlet port which is opened and closed by the plunger, with the secondary outlet or release port which is arranged to work in relation to some static part of the apparatus and which is uncovered by the movement of the sleeve valve, means being provided for adjusting the position of said static part of the apparatus by hand or automatically for the purpose of altering the moment when the release port shall be opened and the delivery stroke terminated.

The valve sleeve may be driven by a separate shaft through the medium of mechanism provided with a floating fulcrum that can be adjusted in such manner that the closing of the ports and thus the commencement of injection can be adjusted by hand when the engine is running. Provision may be made for correspondingly varying, in the reverse direction, the setting of the pump plunger.

The valve sleeve may be guided upon a fixed stem or plunger adapted to absorb part of the pressure reaction that is not absorbed in the fuel jet.

A non-return valve is located near the fuel jet, this valve being of such a nature that the flow of oil and the travel of the wave are not unduly impeded. The valve preferably has a forward seat of conical or other suitable form provided with grooves (which may be axial or helical) so as to allow the valve to come to rest and the oil to travel past the valve through the said grooves.

By means of the pump hereinafter described the liquid fuel can be ejected at a high pressure at the moment when it is required, and for such a period as is required.

I will now describe in more detail with reference to the somewhat diagrammatical drawings hereof, some of the mechanical means that may be employed for carrying out my present invention, it being understood that such mechanism is in many respects one of numerous alternatives which would be varied or selected to suit particular circumstances, such as high-speed or low-speed, four-cycle or two-cycle, single-cylinder or multi-cylinder, hand-regulated or governor-operated, engines, and so on.

Figure 1 of the accompanying drawings is a side view of a vertical two-stroke Diesel engine provided with a pump in which the present invention is embodied, the cylinder head and the upper end of the cylinder being shown broken away in order to disclose the combustion chamber and a portion of the piston.

Fig. 2 shows to an enlarged scale a similar side view of the pump with the near side of the casing removed, one of the guides being shown broken away in order to disclose the cross-head therein.

Fig. 3 is a transverse vertical section taken on the line 3—3, of Figure 2.

Fig. 4 is a vertical section through the end of the pump plunger and valve sleeve showing the primary or inlet port.

Fig. 5 is a horizontal section taken on the line 5—5 of Fig. 4.

Fig. 6 is a vertical section through the valve sleeve and the end of the regulating collar, showing the secondary outlet or release port.

Fig. 7 is a horizontal section taken on the line 7—7 of Fig. 6.

Figs. 8 and 9 are longitudinal sections through two arrangements of non-return valve in accordance with the invention showing the same mounted within a portion of the injector casing.

Referring now to the drawings, throughout which the same numerals of reference are used to denote corresponding parts as far as possible, and first to Fig. 1, there is here shown in outline a single-cylinder vertically-arranged Diesel engine including a cylinder 20 mounted on the top of a crank casing comprising an upper portion 21 and lower portion 22 which may be bolted or otherwise secured together in any convenient manner. The engine crank-shaft 23 to which is keyed or otherwise secured the fly-wheel 24 is carried by bearings 25, 26, which are conveniently arranged at the joint of the upper and lower portions 21 and 22 of the crank casing. 27 represents the engine crank which is shown at or near its top dead-centre position. The crank is connected in any suitable way to the big end of the connecting rod 28, the little end of which is connected up with the piston 29. 30 represents the pump casing which is shown secured at one end of the upper portion 21 of the crank-casing against a machined surface 31 thereon. 32 represents a way-shaft of the engine which is arranged to extend into the interior of the pump casing 30, and may be connected to be driven from the crank shaft 23 in any suitable manner. Fuel can be fed by gravity to the pump from the fuel reservoir 33 by means of the connecting pipe 34, the fuel being pumped along pipe 35 to the working cylinder. The other end of pipe 35 is secured by a union to the injector casing 36 which is shown bolted to the cylinder head 37. Within the injector casing is a non-return valve 38 adapted to disconnect the duct of pipe 35 from communication with the combustion-chamber through the jet holes 39.

The parts so far described in general terms represent those which are commonly found in any suitable type of internal-combustion engine operating on the Diesel principle; they are not described in greater detail, as various modifications may be made in the arrangement of these parts, which will be well understood by those skilled in the art, to meet different operating conditions.

Arranged externally of the pump casing 30 is the handle 40 of the fuel quantity regulator, this handle co-operating with the quadrant 41. 42 (Fig. 3) represents the handle of the fuel quantity adjuster mechanism. 43 represents the handle of the fuel injection timing mechanism.

Turning now more particularly to the arrangement of pump illustrated in Figures 2 and 3, the pump casing 30 comprises an upper portion 44 and a lower portion 45 secured to the underside of the upper portion in any suitable manner. The upper portion 44 encloses the pump proper and the fuel-quantity adjusting and regulating means, and the lower portion 45 encloses the operating mechanism for the pump elements, and the means for varying the timing of the fuel injection. The fuel pipe 34 communicates at 46 with the upper enclosure 44. Thus enclosure 44 provides a secondary fuel reservoir, being fed with fuel under gravity pressure from the tank 33. 47 represents an overflow outlet from this secondary reservoir.

The stem or fixed plunger 48 forming the pump duct is provided with a head arranged to nestle within the socket 49, the head being clamped in position by means of the union 50 engaging internally with the socket 49 and joining there-against the head of pipe 35. The valve sleeve 51 is guided for reciprocation by the stem 48. Formed in sleeve 51 are the secondary outlet or release port 52 and the primary or inlet port 53 of the pump. A regulating collar 54 is grooved peripherally to receive the arms 55 which are fulcrumed on the eccentric 56 carried by shaft 57. The handle 42 is directly connected to the shaft 57. Intermediate their ends, the arms 55 are hinged at 58 on the link 59 carried by the eccentric 60 mounted on shaft 61, which is operable by the handle 40 and carried by the bearings 62 in the ends of the enclosure 44. With this arrangement it will be evident that, when the handle 40 is fixed in position and the pivot 58 consequently fixed also, operation of handle 42 by rotating the eccentric 56 in one direction or the other will rock the arms 55 about this fixed centre 58 and thus slide the regulating collar 54 up or down with respect to the valve sleeve 51. In this case the arm 59 will rock very slightly on its fulcrum as necessary. On the other hand, if one considers the handle 42 to be fixed and the handle 40 to be operated to turn shaft 61, the rotation of the eccentric 60 thereon acts to raise link 59 and thereby to rock the arms 55 about their (for the time being) fixed centre constituted by the eccentric 56, thus sliding the regulating collar 54 upwardly with respect to the valve sleeve 51.

The sleeve 51 is provided at its lower end with an enlarged boss 63 which is slotted or grooved to take the driving cross-yokes 64. The lower end of the sleeve co-operates with the upper end of the pump plunger 65.

The pump plunger 65 is arranged to extend from the upper housing 44 down into the lower housing 45 through the oil-tight packing gland 66 which may be of conventional form and which is mounted in the lower side of the upper housing 44. The lower end of the pump plunger 65 is headed at 67, the head resting in a suitable slot of known T-form provided at the upper end of the crosshead 68 which is guided for reciprocal motion in a vertical direction by the guide 69. Air can pass into and out of the upper side of cross-head 68 through opening 69a. The guide 69 is shown as being provided with a horizontally extending arm by which the guide is clamped through the bolt 70 to the underside of the housing 44. The lower end of the cross-head 68 is hinged at 71 to the rocking lever 72 fulcrumed at 73. The pivot 73 is carried by the arm 74 mounted on the eccentric 75 secured to the shaft 76 which is carried in any suitable bearings within the housing 45 such as that indicated with the reference numeral 77. Intermediate its ends the rocking lever 72 is pivotally connected at 78 to the driving eccentric 79 mounted on the way-shaft 32, which, as previously stated extends from the main engine through the side of the pump casing 30.

The ends of the cross-yokes 64 are trunnioned at 80, 80 on to the rods 81, 81, as shown clearly in Fig. 2. These rods 81 which are similar and operate to drive valve 51 in unison are adapted to extend down into the lower housing 45 through bushings 66' similar to that designated 66 and previously described. Moreover the lower ends of rods 81, 81 may each be adapted in exactly the same manner and connected with similar crossheads arranged to operate within similar guides, as has been described above in connection with the pump plunger 65, crosshead 68 and guide 69.

In Fig. 2 the guides for the cross-heads of rods 81, 81 are shown in outline and are designated by the reference numerals 82, 82. The lower ends of each of these crossheads are hinged to rocking levers (not shown) which are arranged parallel to and one on each side of the rocking lever 72 and are similar thereto. Moreover, the rocking levers for the crossheads associated with guides 82, 82, are similarly mounted; except that their fixed centres are carried by the arms 83 associated with the eccentrics 84 secured to the timing shaft 76 on opposite sides of eccentric 75. It will be noted that the eccentrics 75 and 84 are 180 degrees out of phase with one another, and both eccentrics 84 (of which only one is shown) are in phase with one another. Moreover, the rocking levers associated with the guides 82 are each arranged to be driven intermediate their ends by rods 85 mounted on eccentrics 86 carried by the cam-shaft 32. Both eccentrics 86 (of which only one appears in Fig. 3) are in phase with one another and 180 degrees out of phase with eccentric 79. The eccentrics 86 are on opposite sides of eccentric 79. The bearings 87 carry the cam-shaft.

It will thus be seen that the way-shaft 32 on rotating will drive the crosshead associated with the pump plunger 65 upwardly at a time when the rods 81 are being driven downwardly, and vice-versa Thus the operation of the way-shaft 32 effects the reciprocation of the pump plunger 65 and the valve sleeve 51 in opposite directions synchronously, as the eccentric 79 is exactly 180° out of phase with the eccentrics 86.

It will be readily understood that when the handle 43 associated with the shaft 76 is stationary, the three rocking levers will operate about aligned pivots corresponding to that designated 73, and that these pivots will move very slightly to and fro with the motion. On the operation of the handle 43 in a direction, for example, to rotate shaft 76 clockwise (Fig. 3) so as to carry the eccentric 75 upwardly and eccentrics 84 downwardly, the fixed centre for rocking lever 72 will be raised, and if one considers way-shaft 32 to be momentarily stationary it will be evident that the crosshead 68 will be slightly lowered.

At the same time the rocking levers associated with the crossheads operating in guides 82, 82, will be rocked in the other direction; thus the left-hand ends of the rocking levers will be lowered through the rotation of eccentrics 84 in a clockwise sense, and their right-hand ends will be raised. Thus, considering the way-shaft 32 to be momentarily stationary, the whole valve sleeve 51 and its operating mechanism will be slightly raised. As all the corresponding rocking levers, eccentrics and links are of the same order, the valve sleeve 51 will be raised to exactly the same extent that the pump plunger 65 is lowered. The commencement of the period of injection relative to the cycle, and consequently the finish of this period, can be adjusted by the operation of this shaft 76. If the plunger is fulcrumed on a fixed fulcrum instead of on the eccentric 75, then the duration of the period of injection can be maintained constant whatever the position of shaft 76, which through eccentric 84, affects the position of sleeve 51. Thus, if the sleeve be raised through the rotation of eccentric 84, the injection period will commence slightly later—relative to the cycle—but it will also end a corresponding amount later.

In the detailed views of Figs. 4 and 5 the upper end of the pump plunger 65 is shown as being pointed at 90 and streamlined. The primary or inlet port of the pump consists of an internal peripheral groove 91 in the sleeve and the number of radial passages leading therefrom to the exterior of the sleeve and tapered as shown.

The secondary outlet or release port 52 of the pump, which is shown in Figs. 6 and 7 in detail, will be seen to involve an outer peripheral groove 92 communicating with the interior of the valve sleeve 51 by means of a number of radial ducts which are shown slightly inclined.

In Fig. 8 a portion only of the injector casing 36 is shown and the same is provided with an oil duct 93 which enlarges towards its lower end at 94 and provides thereat a seating for the co-operating end of the streamlined non-return valve 38. This non-return valve is shown as being of substantial dimensions and weight. Helical or other grooves 95 at the lower end of the injector are provided in known manner to prevent the reverse end of valve 38 from closing up the jets 39. In this modification the valve 38 is shown as being drilled up from its lower end at 96, and in this bore is accommodated a helical spring 97 seating on the lower end of the injector casing and acting to urge the valve 38 on to its seating 94 to close the duct 93.

In the modification shown in Fig. 9, which is particularly suitable for high-speed engines, the duct 93 is enlarged at 98 to accommodate a helical spring 99 arranged to bear on the arm or triangular collar 100 secured to the stem 101 of the non-return valve 38 so as to urge it upwardly on to its seating 94 and thus to close the duct 93.

The operation of the arrangement illustrated is as follows:—Piston 29 is shown at or approaching its top-dead centre position, and cam-shaft 32 is assumed to be rotating clockwise. Thus with the various elements in the positions illustrated, the pump plunger 65 is approximately at half stroke, travelling upwardly at its maximum velocity and valve sleeve 51 is also approximately at half stroke, travelling downwardly at its maximum velocity. Release port 52 is closed by collar 54, and the inlet valve 53, which is still allowing liquid to escape into the secondary reservoir within casing 44, is on the point of closing. Actually the end of the plunger 65 over-runs inlet port 53 just before half stroke.

The internal area of groove 91 may be so arranged as to produce a pressure not exceeding a certain definite amount, say, twenty five pounds per square inch, when the plunger 65 is at maximum velocity, and the engine at maximum speed, in which case the axial dimension will be very small, in the neighborhood of .02 of an inch. As, however, the sleeve 51 is moving at the same velocity as the plunger (in the example illustrated), this inlet port 53 will close in half the angular period, certainly before there is any appreciable rise in the oil pressure, with the result that, not only will the terminal velocity of the oil passing through the port be low, but the compression of the oil in the body of the pump between the two plungers 48 and 65 will be for all practical purposes at the maximum velocity of the plunger 65.

As the delivery stroke progresses, by the opposite relative movements of the plunger and valve sleeve, the oil will be delivered through the jet 39 into the combustion chamber until the sleeve has reached such a position as to allow the outlet port 52 to pass beyond the regulating collar 54, when the next return flow will expend itself into the secondary reservoir 44; and, further, the compressed oil in the duct will also expand as already explained and the inertia of this expansion will tend to cause the whole column of liquid to move away from the jet 39; this action being exemplified by the behaviour of a spring compressed on a table and then suddenly released, when the inertia of the moving part of the spring lifts the spring bodily from the table.

The relative speed of the valve sleeve 51 and collar 54 is slow compared to the relative speed of the plunger 65 and the valve sleeve 51, but in the former case the slot edge of the outlet port 52 is formed as a circumferential groove 92 and consequently has a much greater circumference which will produce the desired rapid port opening (or valve rate) and correspondingly rapid release of pressure.

The total stroke of plunger 65 is equal to approximately eight times the actual delivery stroke of the pump which corresponds with the usual angular period of injection.

The quantity of fuel to be delivered, i. e., the effective length of the working stroke of the pump, will normally be regulated by the operation of handle 40, which may be connected to the engine governor for this purpose. By sliding collar 54 downwardly outlet port 52 opens later and increases the fuel delivery: by sliding collar 54 upwardly the injection period terminates earlier. Individual adjustment can be effected by operation of handle 42, as, in a multi-cylinder engine, all the handles 40 would be operated synchronously by the governor. The collar 54 can be placed so that outlet port 52 will open at the beginning, at the end, or during the normal delivery stroke.

It should be noted that there is no load on the collar other than the slight friction load and therefore the re-action on the adjusting lever 40 will be very slight, and as this force is alternating the governor will not be disturbed.

I consider that it is essential or certainly very advisable that the commencement of injection should be adjustable whilst the engine is running, and this is provided for by the arrangement of the timing shaft 76 and eccentrics 75 and 84.

On the return stroke of the plunger 65, during the explosion stroke of the engine, oil will be drawn in through the ports, sometimes through one and sometimes through both, until the end of the stroke is reached, and then the oil will be displaced by the upward stroke of the plunger and will pass out through the ports 53 until this primary or inlet port is closed by the plunger, as already described.

In order to prevent air being drawn into the jet 39 in any quantity, or the compressed charge in the engine cylinder 20 from forcing the oil out of the pump, the non-return valve 38 is placed as close as possible to the jet.

The operation of this non-return valve 38 is such that as soon as the pressure in the column of liquid strikes the valve the latter is forced into the forward grooved seating (grooves 95), the distance of travel being very small, which movement allows the oil to flow out to the jet 39, passing thereto through the grooves, which may be spirally or helically arranged. Such grooves provide a certain diffusing effect, the extent of which can be pre-determined by the selection of the angle of the grooves. On the opening of the secondary or outlet port 52 by the passage of the latter beyond the edge of the regulating collar 54 of the pump the inertia due to the expansion of the oil column will cause, or tend to cause, a vacuum on the pump side of the non-return valve, which would close, and in so doing withdraw what oil there was in the actual jet and thus prevent dribble.

There are numerous ways of making and arranging this non-return valve, but the constructions described with reference to Figs. 8 and 9 contain the main characteristics; which are that the valve shall not obstruct the compressed flow but allow it to impinge on the jet as instantly as possible. Many variations and modifications of the non-return valve will be allowable in practice, particularly in the direction of retaining the stream-line effect, eliminating inertia effect as much as possible, and providing against the shock of the flow, although it may be found that the most effective method of doing this will be to provide a comparatively heavy valve so as to reduce the actual velocity of movement in the same manner that the stock of a gun is weighted to lessen the shock of recoil.

I claim:—

1. In a liquid pump, co-operating piston and sleeve members located in a fuel reservoir, means for reciprocating said members in opposite directions, a stationary member co-operating with the sleeve, a primary or inlet port in the sleeve controlled by the relative movement of said members, and a secondary outlet or release port in the sleeve controlled by the movement of the sleeve with respect to said stationary member.

2. In a liquid pump, co-operating piston and sleeve members located in a fuel reservoir, means for synchronously reciprocating said members in opposite directions, ports in the sleeve, one of the ports being controlled by the relative movement of said members, and an adjustable stationary member positioned to control another of the ports.

3. For a Diesel engine, a fuel reservoir, a pump comprising co-operating piston and sleeve members adapted to be oppositely reciprocated within the reservoir, and ports in the sleeve, each port comprising a plurality of radial passages through the sleeve and an annular groove common to all the passages of one port, said ports being partly controlled by the movement of the sleeve.

4. A liquid pump located within a liquid-containing reservoir and comprising co-operating plunger and sleeve members each of which is adapted for reciprocation, a stationary collar surrounding the sleeve, a port in the sleeve controlled by the motion of the sleeve with respect to the collar, said port comprising an external outer annular groove and radial passages connecting the groove with the interior of the sleeve, and a second port controlled by the relative motion of said members, said second port comprising an internal annular groove and radial passages connecting the groove with the exterior of the sleeve.

5. For a Diesel engine, a fuel pump comprising a fixed plunger, a ported sleeve co-operating at one end with the fixed plunger, a movable plunger co-operating with the other end of the sleeve, means for reciprocating the movable plunger and sleeve in opposite directions and means for oppositely and synchronously adjusting the drives for the movable plunger and sleeve during the reciprocation thereof.

6. In an internal combustion engine having a jet through which liquid fuel can be injected, a pipe leading to the jet, a fuel reservoir, a fixed tubular plunger located in the reservoir and connected to the pipe, a long stroke sleeve adapted to be reciprocated along the plunger within the reservoir, the sleeve having a radial inlet port therein by which liquid in the reservoir can enter the interior of the sleeve and pass to said plunger and pipe, and a long-stroke plunger adapted to be reciprocated within the sleeve to co-operate with said port.

7. In an internal combustion engine having a jet through which liquid fuel can be injected, a pipe leading to the jet, a fuel reservoir, a fixed tubular plunger located in the reservoir and connected to the pipe, a long-stroke sleeve adapted to be reciprocated along the plunger within the reservoir, the sleeve having a radial outlet port therein by which liquid can pass from the sleeve to the reservoir, and an adjustable collar on the sleeve adapted to co-operate with said outlet port.

ARTHUR FREDERICK EVANS.